SHAFT ROCKING MECHANISM

Filed March 27, 1961 2 Sheets-Sheet 1

INVENTOR
RAYMOND ROBERT LUPKAS
BY
Blair and Buckles
ATTORNEYS

Jan. 1, 1963 R. R. LUPKAS 3,071,010

SHAFT ROCKING MECHANISM

Filed March 27, 1961 2 Sheets-Sheet 2

INVENTOR
RAYMOND ROBERT LUPKAS

BY

Blair and Buckles

ATTORNEYS

United States Patent Office 3,071,010

Patented Jan. 1, 1963

3,071,010

SHAFT ROCKING MECHANISM

Raymond Robert Lupkas, Waterbury, Conn., assignor to General Time Corporation, New York, N.Y.

Filed Mar. 27, 1961, Ser. No. 98,491
12 Claims. (Cl. 74—1)

This invention relates to a shaft rocking mechanism and more particularly to a mechanism for rocking a shaft from one rest position to a second rest position using a unidirectional linear actuating force. In the preferred embodiment, the same force, upon re-energization, is useful to impart a return rocking stroke to the shaft. Hereinafter, the phrase "and return" will denote such movement of the shaft upon re-energization of the actuating force.

It is frequently necessary to reversibly rock or to partially rotate a shaft about its axis with the use of a unidirectional linear force. One common use is in data card sensing apparatus such as disclosed in copending patent application Serial No. 841,926, filed September 21, 1959.

As disclosed in that application, a data card with a modular arrangement of punched slots therein is "read" by feelers which traverse the card longitudinally. Each modular arrangement punched into the card denotes certain specific data.

Initially the card is inserted into a slot and locked therein by a card clamping mechanism. This prevents premature removal of the card during the reading operation. It also prevents movement of the card so that a false reading will not be made.

To effect locking and unlocking of the card clamp, the apparatus shown utilizes a solenoid and a pawl-ratchet wheel assembly which rotates a cam shaft. The shaft contains cams which act upon the clamp to lock or unlock the data card.

At each energization of the solenoid, the drive pawl of the pawl-ratchet assembly is advanced over the ratchet wheel to partially rotate a drive gear. A spur gear, which meshes with the drive gear and is integrally connected to the cam shaft, gears up the rotary movement and rocks the cam shaft in one direction. The cams on the shaft are thereby rotated to present successive high or low dwell surfaces to the clamp. When a high dwell surface is presented the clamp unlocks the card and it can be removed.

While this mechanism operates satisfactorily, it is expensive, cumbersome and frequently requires accurate adjustment. Any maladjustment results in under-travel or over-travel of the high or low dwell surfaces of the cam with a resultant adverse effect on the force of the clamp upon the card or upon its complete release.

The use of a solenoid to actuate the mechanism places limitations on any substitute mechanism that could be employed. Since a solenoid generates only a unidirectional force, the mechanism must be able to utilize this force to both clamp and unclamp the card. In addition, it must be able to generate sufficient clamping force to adequately grip the data card without damage thereto. Other desirable attributes require that the movement of the mechanism be positive so that a sharp clamping or unclamping action occurs. Furthermore, the movement once actuated, should be capable of completng its stroke so that the normal sequence of operation will not be interrupted.

While many attempts have been made to construct substitute apparatus, none have heretofore been completely successful.

In attempting to construct such substitute apparatus, it becomes evident that other uses exist for the shaft rocking mechanism. For example, in electrical switching apparatus, a rocking shaft could be used to open and close the stwitch contacts. Either a pull-chain or a push button could be used as the actuating force. A rocking shaft also has utility in locking mechanisms, wherein the shaft may constitute means for keying the key hole. Other uses of the invention are also conceivable.

An object of this invention is to provide a mechanical movement which can rotate a shaft from one rest position to a second rest position and return.

Another object of this invention is to provide a reversible rocking movement of the above character which utilizes a unidirectional linear actuating force.

A further object of this invention is to provide a reversible rocking movement of the above character which is positive in action.

A still further object of this invention is to lock and unlock a clamp using a reversible rocking movement of the above character.

Another object of this invention is to lock and unlock a clamp using a reversible locking movement of the above character which utilizes a unidirectional linear actuating force.

Another object of this invention is to provide a reversible rocking movement of the above character which cannot jam in an intermediate position between the two angular rest positions.

Another object of this invention is to provide a reversible rocking movement of the above character which utilizes a simple mechanical structure.

Another object of this invention is to lock and unlock a clamp with the use of said simple mechanical structure.

Another object of this invention is to provide a reversible rocking movement of the above character which occupies a minimum of space.

Another object of this invention is to provide a reversible rocking movement of the above character which is operable by a solenoid.

Another object of this invention is to provide a reversible rocking movement of the above character, which can be incorporated into existing equipment.

Another object of this invention is to provide a clamp camming means requiring minimum adjustment.

Another object of this invention is to provide a movement of the above character which is structurally economical.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figures 1, 8, 9:
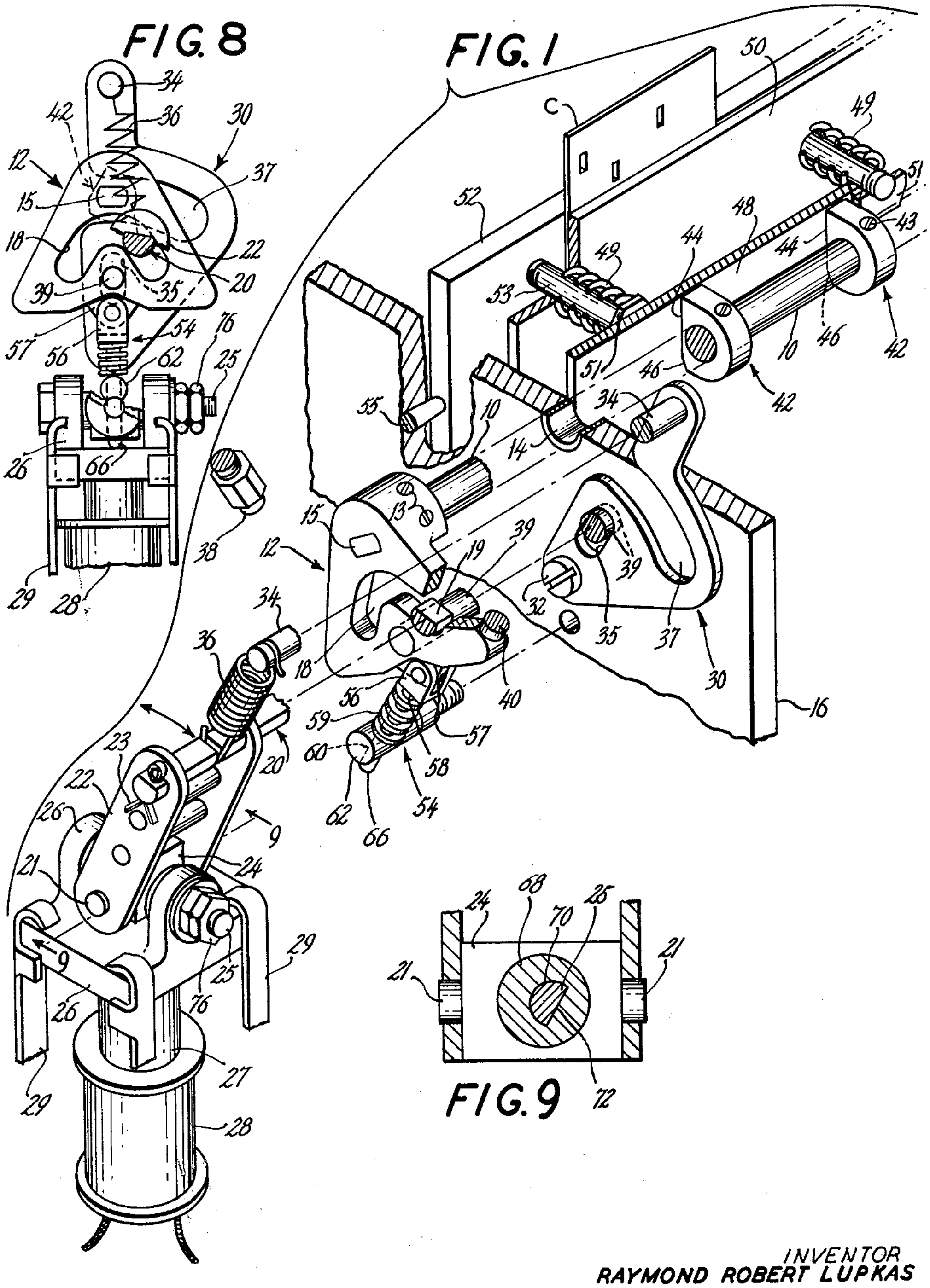
FIGURE 1 is an exploded perspective view of the shaft rocking mechanism of this invention as it appears when in rest position No. I.
FIGURE 8 illustrates a side view of the shaft rocking mechanism as it might appear after an incomplete stroke of the actuating means.
FIGURE 9 illustrates a sectional view of the actuating bail-pivot block adjustment taken along lines 9—9 of FIGURE 1.

As seen in FIG. 1, the shaft rocking mechanism of this invention comprises a shaft 10 which is affixed to a bell crank 12. The bell crank contains an inverted V-shaped cam slot 18. One end of an actuating arm 20 protrudes into the cam slot and acts as a finger cam 19. When downward force acts against the arm, the finger cam 19 pivots the bell crank into a rest position, such as shown in FIG. 1. This right-sided angular position will hereinafter be termed rest position No. I.

Upon release of atcuating force the arm is pulled upwardly by a spring and the finger cam moves upwardly into and then over the apex of the inverted V slot. This recocks the mechanism for a second actuating stroke.

On a subsequent application of force upon the actuating arm, the finger cam 19 rocks the bell crank in an opposite direction to its second rest position (see FIGURE 7), hereinafter termed rest position No. II. Again upon release, the arm is pulled upwardly to move the finger cam upward into and then over the apex of the inverted V slot. The mechanism is again cocked. Subsequent application of force repeats the cycle of movement described above for a "return" stroke.

To aid in proper directional biasing of the actuating arm, the rocking mechanism includes a pilot arm 30 which pivots in a direction opposite to the direction of the bell crank.

The pilot arm 30 contains a stud which provides support for the biasing means of the actuating arm. By pivoting in a direction opposite to the bell crank, the stud is always in its most advantageous force-imparting position with respect to the actuating arm.

To avoid any incomplete travel of the cam finger over the apex of the V slot in the bell crank, a bell crank toggle 54 is used. This toggle bears against the bell crank and supplements the terminal rocking force of the actuating arm. More specifically, the toggle 54 has a spring-encircled rod which engages the bell crank at a point removed from its rocking axis. This biases the bell crank with a force tending to rock the crank into one of its rest positions. No "hang up" by reason of a dead center hung position can therefore occur to completely inactivate the mechanism.

In the preferred form, the toggle 54 has a second function. The lower end of its rod member pivots into engagement with the actuating force member so that it will take up any renewal of actuating force in the event of an incomplete actuating stroke. In such role, it prevents the cam finger from being recocked or from being biased into the neutral apex of the bell crank. Such function is especially valuable where a solenoid is used as the actuating force means and there is a possibility of interruption of power immediately after actuation of the mechanism.

The mechanism, in addition, contains other elements which act to smoothen its operation. For example, it uses an adjustable pivot between the bail and the actuating force means.

In addition to these novel features the mechanism is designed to use any actuating force means particularly those employing unidirectional moving elements such as the plunger rod of a solenoid, the piston of a pneumatic power means or a manually atcuated plunger.

*Structure*

Referring particularly to the drawings for a detailed description of the structure, the mechanism of this invention consists of a shaft 10 which is affixed, at one end, to a bell crank 12. The connection is preferably made adjustable by the use of set screws 13 acting upon a flattened end 15 of the shaft.

The shaft 10 is journaled in bearing 14 contained within a side plate 16 of the apparatus in which the shaft rocking mechanism is utilized. Obviously other support members could be used to contain the bearing.

The bell crank contains an angular, or preferably an inverted V-shaped cam slot 18. The slot is formed with rounded corners to facilitate movement of cam finger 19 over its surfaces.

Cam finger 19 comprises the far end of an actuating arm 20. The near end of the actuating arm is affixed to the upper end of an actuating bail 22 with cotter pins 23 (only one shown).

As shown in FIGURE 1 by the double pointed arrow, the actuating arm moves laterally in arc fashion during movement of the mechanism.

The actuating bail is pivoted on stud pins 21 of the pivot block 24. Block 24 is adjustably secured to shaft 25 as explained hereinafter. Shaft 25 extends across a trunnion-shaped armature 26.

In the embodiment shown, the armature is secured to the end face of a plunger rod 27 of a solenoid 28 and reciprocates vertically therewith. Movement of the armature is guided by guides 29.

Obviously, the armature may be affixed to other actuating force means; such as, for example, the piston rod of a pneumatic power assembly, or the plunger rod of a manually operated push button. As described in greater detail hereinafter, the plunger rod is normally biased in a direction counter to the force applied by the force means.

A pilot arm 30, pivoted at its lower end to side plate 16 by pivot bolt 32 acts as a support for an actuating arm biasing means. Movement of the pilot arm corresponds with the movement of the bail 22 as indicated hereinafter.

The upper end of the pilot arm contains a spring support stud 34 which extends forwardly toward the actuating bail (see FIGURE 1). An actuating arm spring 36 is extended between stud 34 and actuating arm 20. The spring biases the armature, the bail, and the actuating arm upwardly.

To effect corresponding movement of the pilot arm with bail 22, the former contains an elongated slot 35 which coacts with a cam stud 39 extending rearwardly from the bell crank. Pivotal movement of the bell crank causes the cam stud 39 to move in a pendulum-like movement within the elongated slot 35 to pivot the pilot arm from right to left and return. Such oscillatory movement of the pilot arm properly positions the actuating arm spring 36 so that its biasing force always tends to pull the bail upwardly along its longitudinal axis.

The pilot arm contains an arcuate slot 37 to provide clearance about shaft 10 as it oscillates.

Movement of the bell crank is limited by stops 38 and 40. These stops are affixed to some fixed element within the apparatus housing. Their spacing may be adjustable to define varying arcs. Bolts 41 on each stop (FIGURE 2) are used for such adjustment. In the embodiment shown in FIGURE 1, they are so spaced that the bell crank can pivot through an arc of approximately 60 degrees. Larger or smaller arc spacings are, of course, feasible dependent upon the needs of the situation.

The far end of shaft 10 contains clamp cams 42 secured by set screws 43. These cams have a flat plate engaging surface in which the flat midsection acts as a low dwell surface 44, and the angular edge section acts as a high dwell surface 46. These surfaces act against a movable plate 48. The plate bears against heads 51 of rods 53 which are threaded to a movable clamping jaw 52. The heads, the rods, and the clamping jaw are normally biased against the movable plate by springs 49 which are compressed between fixed clamping jaw 50 and the heads 51 of the rods. Any movement of the movable plate 48 will further compress springs 49 to pivot the movable clamping jaw about pivot pin 55 on support plate 16. When so pivoted, the data card C within the clamp is then liberated and can be removed.

To avoid the possibility of jamming and to effect a more positive rocking movement, the mechanism utilizes a toggle 54. The toggle is pivotally connected by a clevis 56 to a centrally located tab 57 on the underside of the bell crank. Extending downwardly from the clevis is a rod 58 encircled by a toggle spring 59 which is compressed between the clevis and a stud 62 pivoted to side plate 16. The lower end of the rod fits loosely within an orifice 60 within the stud 62.

The bottom surface 66 of the lower end of the rod 58 acts as a movement camming detent. During movement of the bell crank, the rod oscillates from right to left and return. When it is vertical, such as illustrated in FIGURE 8, its bottom surface faces the top surface of the armature.

In the event of a partial stroke of the actuating rod, such as, for example, during a power failure, armature 26 will be blocked by end 66 of toggle rod 58. In this condition, as observed from FIGURE 8, all of the elements except bail 22, and actuating rod 20 are over dead center position. End 66 prevents the armature from rising and the spring 36 from drawing the cam finger 19 over the apex of the V slot 18. It must therefore remain in the right leg of the cam-slot 18. No recocking can occur. Thus, with such an arrangement, any resumption of the actuating force will merely carry the mechanism through its initial movement. Hence, regardless of the duration of power failure, the mechanism remains conditioned for a full rocking movement, and there is no "hang-up" or out of phase movement with respect to other mechanism in the apparatus in which the rocking mechanism is utilized.

Upon reactivation of the solenoid 28, the armature 26 is again drawn down to rotate the bell crank 12 clockwise. Pilot arm 30 moves counterclockwise to position the actuating arm spring 36 to pull the cam 19 over the apex of the V slot and thereby recock the mechanism.

In FIGURE 9, the adjustable pivot between the block 24 and bail 22 is shown in cross section. This adjustable pivot prevents pin 20 from bottoming in either extremity of slot 18 when under the actuating force of solenoid 28.

The pivot consists of an eccentric ring 68 mounted within block 24. Its orifice 70 contains a flat 72 which engages a corresponding flat on shaft 25, which secures the armature to the block. The bail is secured to the block by stud pins 21 extending from opposite sides of the pivot block.

By manually holding the armature 26 to its downward limit in contact with solenoid 28, the actuating arm 20 (and finger 19 thereof) is bottomed in the right extremity of inverted V slot 18 and is drawn downwardly therewith. The mechanism now approximates the position illustrated in FIGURE 5. However, for adjusting purposes the bell crank 12 would here be fully rotated against stop 38 and the cams 42 would be rotated to full unclamping position (rotated approximately 60° clockwise from the FIGURE 1 position).

Figures 4, 5, 6, 7:
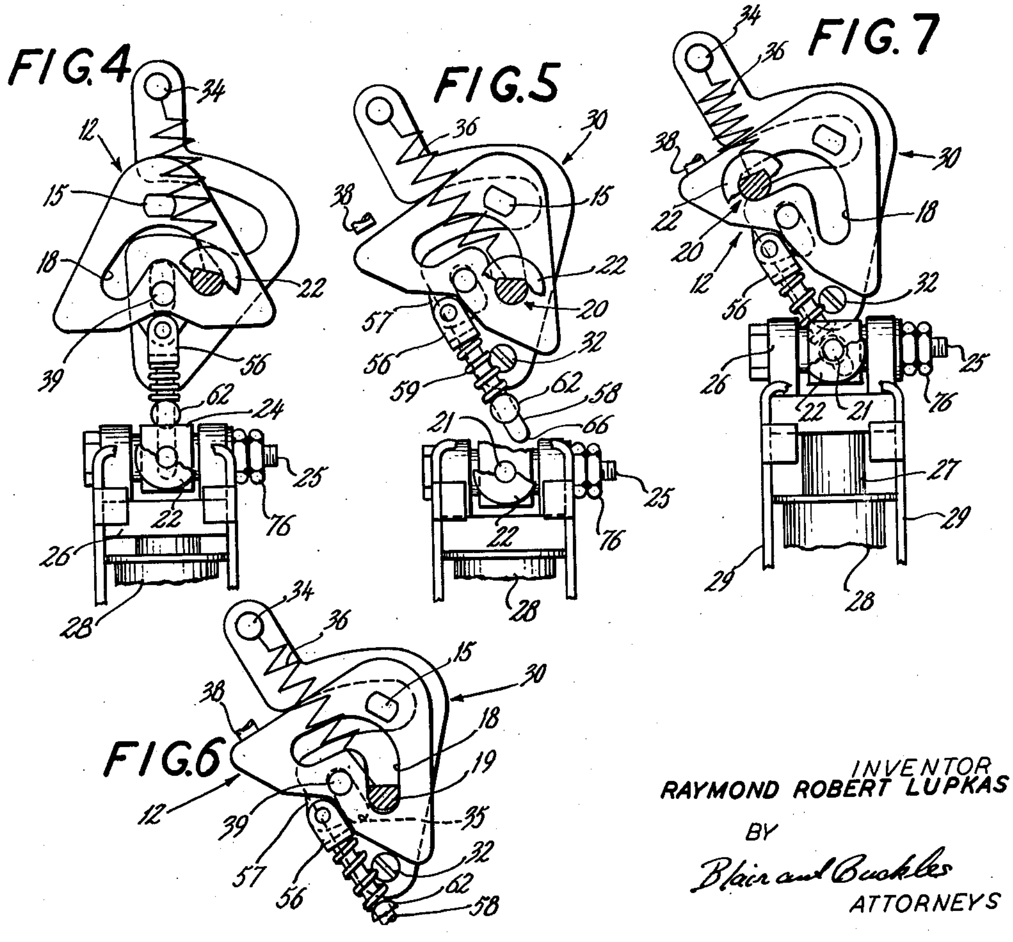

At this time, locking nuts 76 are loosened while the armature 26 continues to be held in its extreme downward position. The shaft 25 is now turned approximately 30° clockwise whereupon bail 22, block 24 and actuating arm 20 are slightly elevated with respect to armature 26. Cam finger 19 which forms a part of actuating arm 20 is now lifted the slight amount (see FIG. 6) from the right extremity of the inverted V slot 18. With such adjustment, the armature 26 may be drawn to its fully actuated position (see FIG. 5) before the bell crank 12 achieves its full excursion of pivotal movement. Moreover, the bell crank 12 and cams 42 may now glide by momentum, while aided by the angular characteristic of portion 46 on cam 42, to fully actuated position, as illustrated in FIG. 7. Such adjustment affords the elements a smooth operating action and prevents undue force on the actuating members, particularly finger portion 19.

At this time, nuts 76 are tightened to maintain the adjustment just made.

Although this position of adjustment is not critical, its approximation will insure smooth operation of the mechanism between the pilot arm and the armature. The cam stud will thereafter oscillate within the elongated slot to pivot the pilot arm back and forth in a smooth oscillatory action.

*Operation*

The sequence of operation is described hereinafter as moving from rest position No. I (FIGURE 1) to rest position No. II (FIGURE 7) and return.

Movement is started by application of an actuating stroke through unidirectional downward movement of rod 27. In the embodiment shown, the solenoid 28 generates the actuating force.

Such movement draws the armature 26, the bail 22, and the actuating arm 20 downward against the force of actuating arm spring 36 and toggle spring 59.

As arm 20 moves downward, finger cam 19 in the cam slot 18 of the bell crank moves against the extremity of the right leg of the slot to rock the bell crank in a clockwise direction. Such movement is illustrated sequentially in FIGURES 2 to 6.

Shaft 10 affixed to the bell crank rocks in corresponding fashion. The high dwell surface 46 of clamp cam 42 on the shaft 10 thereby moves the movable plate 48 against heads 51 of rods 53. The rods pivot the movable clamping jaw 52 counterclockwise about pivot pin 55. This releases card C so that it may be removed from within the clamping jaws.

As armature 26 is drawn to its limit of downward travel, the bell crank 12 assumes an angular position, such as shown in FIGURE 5.

It should be noted from FIGURE 5 that the bell crank 12 has not completely pivoted to its left limit stop 38 when the armature has reached its limit of downward travel. Similarly, cams 42 on the shaft have also not arrived at their full high dwell, clamp-unlocking position. The mechanism has been purposely designed and properly adjusted as hereinbefore pointed out, so that the bell crank 12 travels to full actuated position (clamping or unclamping) by the momentum of its oscillating inertia, toggle spring 59 and the characteristic of angular portions 46 of cams 42. Such continued movement after termination of the actuating force serves to soften the impact of bell crank 12 as it engages either of the limit stops 38 or 40 and prevents undue strain applied to finger 19.

As seen best in FIGURE 6, when the bell crank reaches its full rest position II, the actuating arm spring 36 is in its most extended condition. It overcomes such extension by pulling the finger cam 19 with its attachments upwardly into and then over the apex of the V-cam slot. The apparatus is now recocked for a second rocking motion. FIGURE 7 illustrates this recocked condition.

As the bell crank oscillates from right to left and return, it will be noted that the actuating spring 36 assumes several different angular positions. Such positioning is effected in the preferred embodiment by the use of a pivotable pilot arm.

As seen in FIGURE 1, the pilot arm is pivoted by cam stud 39 which extends into the elongated slot 35 of the pilot arm. Now, as the bell crank oscillates, the cam stud moves down and against the left wall of the slot to pivot the pilot arm counterclockwise. This alters the angular position of the spring 36, so that it will, at all times, exert its most advantageous pull force on the actuating arm. The mechanism also operates in reverse fashion.

During clockwise movement of the bell crank to rest position II, toggle 54 initially resists and then assists the actuating force. It also provides against any malfunction in the event of an incomplete stroke of the actuating force.

In its latter function, as illustrated in FIGURE 8, end 66 of the toggle rod 58 passes through a full face position with the upper face of the armature 26 as it pivots counterclockwise. As seen in FIGURE 8, this occurs when the bottom surface of the bell crank is substantially parallel to the upper face of the armature.

Figure 2:
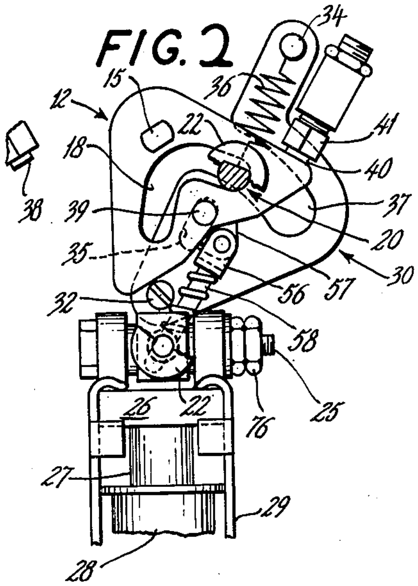
FIGURE 2 is a side elevation of the mechanism shown in FIGURE 1.
Figure 3:
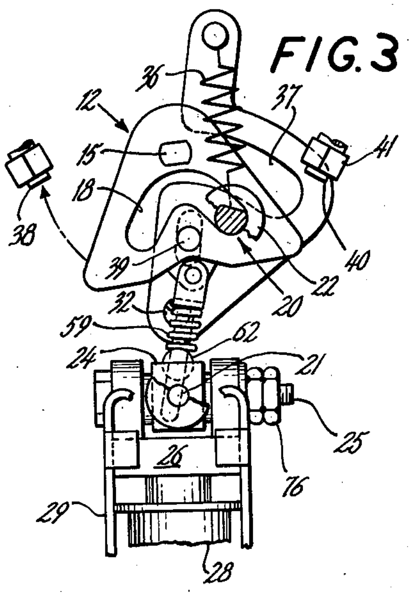
FIGURES 3–7 illustrate side views of the mechanism as it appears in traveling from rest position I to rest position II.

In the event of an incomplete actuating stroke, such as might occur during a power failure, end 66 contacts the armature and prevents it from returning to its initial up-position, such as illustrated in FIGURE 2. And, by reason of the length relationship between pivot pin 21 of the bail and cam 19 of the actuating arm 20, cam finger 19 cannot be drawn upwardly and over the apex of the V-slot. Only upon a complete actuating stroke will the end clear the armature face. Thus the toggle acts to prevent "hang up."

Upon re-energization of the solenoid, a downward actuating force on the actuating rod occurs. This causes a completion of the interrupted rocking stroke of the bell crank.

While the rocking mechanism has been shown as part of a card sensing apparatus, obviously other uses exist for its novel mechanical movement. For example, the apparatus could be used to operate an electrical switch or a keying arrangement in a lock.

In the embodiment shown, shaft 10 is indicated as the energy transmitting member. In actual practice, however, either shaft 10 or an alternate shaft connected to pivot 32 could be used as the energy transmitting member. Other modifications include use of the sides of the bell crank to open or close electrical switch contacts. The arc movement of cam stud 39 of the bell crank has utility for certain apparatus. In addition, there are other modifications and adaptations which could be made to the mechanism.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, a V-shaped cam slot within the body of said bell crank having its apex positioned adjacent said bell crank apex, cam means acting within said slot to oscillate said bell crank to thereby rock said shaft from one rest position to a second rest position and return, a pilot arm operatively connected to said bell crank through a cam stud on the bell crank projecting into an elongated slot within the pilot arm, pivotal pilot arm support means, spring means secured to said pilot arm and to said cam means, said bell crank being operative through said cam stud and elongated slot projection to pivot said pilot arms to successively position said spring means to draw said cam means past the apex of said V-shaped cam slot after each oscillation of said bell crank to recock said mechanism and actuating means operatively connected to said cam means to successively move said cam means against the extremity of the legs of said cam slot to thereby rock said shaft to one of said rest positions.

2. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, a V-shaped cam slot within the body of said bell crank having its apex positioned adjacent said bell crank apex, cam means acting within said slot to oscillate said bell crank to thereby rock said shaft from one rest position to a second rest position and return, means to draw said cam means past the apex of said V-shaped cam slot after each oscillation of said bell crank to recock said mechanism, and actuating means for said cam means comprising an actuating bail pivotally secured, at one end, to said cam means and, to an actuating force means, at its other end, thereby said cam means may be successively moved against the extremity of the legs of said cam slot to thereby rock said shaft to one of said rest positions, said pivot between said actuating bail and said actuating force means being adjustable to provide proper angular movement between said bail and said actuating force means.

3. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, an angular cam slot within the body of said bell crank with its angled portion positioned adjacent said bell crank apex, cam means acting within said slot to oscillate said bell crank to thereby rock said shaft from one rest position to a second rest position and return, means to draw said cam means past the angled portion of said angular cam slot after each oscillation of said bell crank to recock said mechanism, toggle means acting on said bell crank to successively bias said bell crank to one of its rest positions thereby preventing jamming of the mechanism and actuating means operatively connected to said cam means to successively move said cam means against the extremities of said cam slot to thereby rock said shaft to one of said rest positions.

4. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, an angular cam slot within the body of said bell crank with its angled portion positioned adjacent said bell crank apex, cam means acting within said slot to oscillate said bell crank to thereby rock said shaft from one rest position to a second rest position and return, means to draw said cam means past the angled portion of said angular cam slot after each oscillation of said bell crank to recock said mechanism, toggle means pivotally secured, at one end, to said bell crank and slidably secured, at its other end, to a support so as to successively bias said bell crank to one of its rest positions thereby preventing jamming of the mechanism and actuating means operatively connected to said cam means to successively move said cam means against the extremities of said cam slot to thereby rock said shaft to one of said rest positions.

5. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, an angular cam slot within the body of said bell crank with its angled portion positioned adjacent said bell crank apex, cam means acting within said slot to oscillate said bell crank to thereby rock said shaft from one rest position to a second rest position and return, means to draw said cam means past the angled portion of said angular cam slot after each oscillation of said bell crank to recock said mechanism, a toggle pivotally secured, at one end, to said bell crank at a point removed from said bell crankshaft affixation point and slidably secured, at its other end, to a support and having a spring means spanning said two ends so as to successively bias said bell crank to one of its rest positions thereby preventing jamming of the mechanism, and actuating means operatively connected to said cam means to successively move said cam means against the extremities of said cam slot to thereby rock said shaft to one of said rest positions.

6. A shaft rocking mechanism for rocking a shaft from one rest position to a second rest position and return said shaft being adapted for connection to a movable element whereby said element will reciprocate from one angular position to a second angular position and return; said mechanism comprising a shaft, pivotal support means for said shaft, a bell crank having its apex affixed to said shaft, an angular cam slot within the body of said bell crank with its angled portion positioned adjacent said bell crank apex, cam means acting within said slot to oscillate said bell crank to thereby rock said shaft from one rest position to a second rest position and return, means to draw said cam means past the angled portion of said angular cam slot after each oscillation of said bell crank to recock said mechanism, a toggle pivotally secured, at one end to said bell crank at a point removed from said bell crankshaft affixation point and slidably secured, at its other end to a support and having a spring means spanning said two ends so as to successively bias said bell crank to one of its rest positions thereby preventing jamming of the mechanism, and actuating means operatively connected to said cam means to successively move said cam means against the extremities of said cam slot to thereby rock said shaft to one of said rest positions, said support end of said toggle being positioned with respect to said actuating means whereby upon a partial actuating stroke said end will block full return of said actuating means thereby preventing the recocking of said mechanism for a return movement so that the mechanism will remain in in-phase condition for a subsequent full actuating stroke.

7. The shaft rocking mechanism of claim 2 wherein said actuating force means comprises a solenoid having its plunger pivotally secured to said actuating bail.

8. A clamping mechanism having a fixed clamping jaw and a movable clamping jaw, said movable clamping jaw being operatively connected to clamp cam means for opening and closing said movable clamping jaw against said fixed clamping jaw, a shaft, said clamp cam means being secured to said shaft, pivotal support means for said shaft, a bell crank having its apex affixed to said shaft, a V-shaped cam slot within the body of said bell crank having its apex positioned adjacent said bell crank apex, cam means acting within said slot to oscillate said bell crank to thereby rock said shaft from one rest position to a second rest position and return, a pilot arm operatively connected to said bell crank through a cam stud on the bell crank projecting into an elongated slot within the pilot arm, pivotal pilot arm support means, spring means secured to said pilot arm and to said cam means, said bell crank being operative through said cam means whereby said cam stud and elongated slot projection pivot said pilot arm to successively position said spring means to draw said cam means past the apex of said V-shaped cam slot after each oscillation of said bell crank to recock said mechanism, toggle means pivotally secured, at one end, to said bell crank and slidably secured, at its other end, to a support so as to successively bias said bell crank to one of its rest positions thereby preventing jamming of the mechanism and actuating means operatively connected to said cam means to successively move said cam means against the extremity of the legs of said cam slot to thereby rock said shaft to one of said rest positions.

9. A shaft rocking mechanism for rocking a shaft from a first rest position to a second rest position, said mechanism comprising a pivotally mounted actuating bail, a rod fixed in said bail, a bell crank mounted for oscillatory movement fixed on said shaft, said bell crank having a non-linear cut-out formed therein establishing two base areas and a peak therebetween, a first base area for accommodating said bail rod for rotating said bell crank in a first direction, the second said base area for accommodating said bail rod for rotating said bell crank in a second direction, a pin fixed in said bell crank, a pivotally mounted pilot arm having a slot formed therein adjacent its pivotal mounting, said pin in said bell crank located in said slot to pivot said pilot arm, a spring connecting said pilot arm and said bail rod for alternately positioning the latter in said base areas, a full stroke member pivotally mounted on said bell crank to form a toggle therewith for assuring full actuation thereof, guide means for said member, stops cooperating with said bell crank for determining the extent of said oscillatory movement thereof, and activating means including said bail and rod to operate said bell crank in said first direction whereby said shaft is rocked from said first rest position to said second rest position and the same means when deactivated releasing said bail and rod to the force of said spring to move said rod past said peak and position said rod in said second base area to condition said bell crank for return movement to said first rest position.

10. A shaft rocking mechanism for rocking a shaft a prescribed angular distance from a first rest position to a second rest position, said mechanism comprising a pivotally mounted actuating bail, a rod fixed in said bail, a bell crank mounted for oscillatory movement fixed on said shaft, said bell crank having a non-linear cut-out formed therein establishing two base areas and a peak therebetween, a first base area for accommodating said bail rod for rotating said bell crank in a first direction, the second said base area for accommodating said bail rod for rotating said bail crank in a second direction, a pin fixed in said bell crank, a pivotally mounted pilot arm having a slot formed therein, said pin in said bell crank located in said slot to pivot said pilot arm, a spring connecting said pilot arm and said bail rod for alternately positioning the latter in said base areas, an operating solenoid and armature for said bell crank, a full stroke member formed with connecting facilities at one end and a stem at its other end, a guide therefor, said member pivotally connected at said connecting end to said bell crank to form a toggle therewith and fitted in said guide at said stem end, said stem being divorced from said operating solenoid armature through completion of said prescribed angular movement of said shaft whereby said bail rod is transferred by said spring from one base area to a second base area of said bell crank.

11. The mechanism of claim 10 whereby said stem is cooperative with said operating solenoid armature should said operating solenoid fail to actuate said bell crank and shaft more than half the prescribed angular movement whereby said spring is ineffective to move said bail rod from one base area to a second base area of said bell crank.

12. A clamping mechanism having a fixed clamping jaw and a movable clamping jaw, said movable clamping jaw being operatively connected to clamp cam means for opening and closing said movable clamping jaw against said fixed clamping jaw, a shaft, said clamp cam means being secured to said shaft, pivotal support means for said shaft, a bell crank having its apex affixed to said shaft, a V-shaped cam slot within the body of said bell crank having its apex positioned adjacent said bell crank apex, cam means acting within said slot to oscillate said bell crank to thereby rock said shaft from a first rest position to a second rest position, a pilot arm operatively connected to said bell crank through a cam stud on the bell crank cooperative with an elongated slot within the pilot arm, pivotal pilot arm support means, spring means secured to said pilot arm and to said cam means, said bell crank being operative through said cam means whereby said cam stud and elongated slot projection pivot said pilot arm to successively position said spring means to draw said cam means past the apex of said V-shaped cam slot after each oscillation of said bell crank to recock said mechanism, and actuating means operatively connected to said cam means to successively move said cam means against the extremity of the legs of said cam slot to thereby rock said shaft from one to the other of said rest positions.

References Cited in the file of this patent

UNITED STATES PATENTS

| | | |
|---|---|---|
| 2,449,748 | Luft | Sept. 21, 1948 |
| 2,451,449 | Sacchini | Oct. 12, 1948 |
| 2,621,523 | Taylor | Dec. 16, 1952 |
| 2,634,696 | Fermanian | Apr. 14, 1953 |
| 2,682,694 | Kempkes | July 6, 1954 |
| 2,771,784 | Deibel | Nov. 27, 1956 |

FOREIGN PATENTS

| | | |
|---|---|---|
| 17,504 | Great Britain | Aug. 12, 1893 |
| 563,355 | Germany | Nov. 4, 1932 |
| 521,905 | Great Britain | June 4, 1940 |